United States Patent
Wallis

[11] Patent Number: 5,556,189
[45] Date of Patent: Sep. 17, 1996

[54] OMNI-DIRECTIONAL AIRPORT TAXIWAY LIGHT AND FIXTURE

[75] Inventor: David E. Wallis, Simi Valley, Calif.

[73] Assignee: Hughey & Phillips, Simi Valley, Calif.

[21] Appl. No.: 416,952

[22] Filed: Apr. 5, 1995

[51] Int. Cl.$^6$ ............................................. E01F 9/053
[52] U.S. Cl. ................. 362/153.1; 362/299; 362/308; 362/328; 362/331; 362/335
[58] Field of Search .................... 359/808, 811, 359/819, 798–800; 362/153, 153.1, 299, 331, 62, 186, 267, 308, 328, 335

[56] References Cited

U.S. PATENT DOCUMENTS

| | | | |
|---|---|---|---|
| 1,598,044 | 8/1926 | Bone | 362/331 |
| 2,621,569 | 12/1952 | Glassey | 359/800 |
| 2,742,564 | 4/1956 | Bronson et al. | 359/819 |
| 2,954,461 | 9/1960 | Tucker | 359/811 |
| 3,096,024 | 7/1963 | Young | 362/309 |
| 3,999,054 | 12/1976 | Dorman | 362/299 |
| 4,382,274 | 5/1983 | De Backer et al. | 362/153 |
| 4,394,715 | 7/1983 | Dahlberg | 362/153 |
| 4,396,972 | 8/1983 | Kaneko et al. | 362/145 |
| 4,657,721 | 4/1987 | Thomas | 376/104 |
| 4,860,182 | 8/1989 | Vadseth | 362/364 |
| 4,862,335 | 8/1989 | Vadseth | 362/267 |
| 4,910,649 | 3/1990 | Vadseth | 362/145 |
| 4,912,610 | 3/1990 | Dahberg | 362/153.1 |
| 4,914,544 | 4/1990 | Dahberg | 362/153.1 |
| 4,928,213 | 5/1990 | Nakata | 362/299 |
| 5,113,321 | 5/1992 | Suzuki et al. | 362/299 |

FOREIGN PATENT DOCUMENTS

| | | |
|---|---|---|
| 688938 | 6/1964 | Canada. |
| 1142152 | 3/1983 | Canada. |
| 0022106 | 3/1983 | European Pat. Off.. |
| 1158916 | 12/1963 | Germany. |
| 1183455 | 9/1965 | Germany. |
| 214731 | 8/1967 | Sweden. |
| 553686 | 9/1974 | Switzerland. |
| 759848 | 10/1956 | United Kingdom. |
| 966357 | 8/1964 | United Kingdom. |
| WO88/00315 | 1/1988 | WIPO. |
| WO92/04232 | 3/1992 | WIPO. |

OTHER PUBLICATIONS

Advisory Circular, *Specification for Runway and Taxiway Light Fixtures*, 20 pages (U.S. Department of Transportation Federal Aviation Administration, Jun. 7, 1984).

Product Sheet, *Taxiway Omnidirectional Light—Type E* (Crouse–Hinds Navigation Aids, Cooper Industries, Jun. 1988).

Product Brochure, *Holophane Airfield Lighting* (filed on Jul. 12, 1988, with the USPTO).

Catalog Sheet, *L–852E & F Taxiway–Runway Intersection & Heliport Inset Light* (ADB–Alnaco, Inc., date unknown).

Product Brochure, *ZEMAX Optical Design Program* (Focusoft Inc., date unknown).

Primary Examiner—Denise L. Gromada
Assistant Examiner—Alan B. Cariaso
Attorney, Agent, or Firm—Louis J. Hoffman

[57] ABSTRACT

An omni-directional taxiway light uses an axially symmetric conjugate lens pair to distribute lamp light, particularly substantially parallel to the taxiway surface, while protruding minimally above the surface. An associated fixture contains a housing holding the optical elements in fixed relative positions and a weather-proof seal arrangement.

20 Claims, 2 Drawing Sheets

OMNI-DIRECTIONAL AIRPORT TAXIWAY LIGHT AND FIXTURE

Governmental specifications tightly constrain the design parameters for airport and heliport lighting fixtures. Such specifications identify the requirements for light intensity in a variety of directions, for color, for resistance to environmental conditions, for dimensions, and for structural integrity. For example, in this country, Federal Aviation Administration (FAA) Advisory Circular 150/5345-46A (dated Jun. 7, 1984) ("Circular-46A"), which is hereby incorporated by reference, identifies such specifications (and testing procedures) for light fixtures on airport taxiway and runways. For taxiway intersections, the FAA specifies one of two in-pavement, "omni-directional" lights, called types L-852E and L-852F. The specification says that the "E" light must reach 50-candela average intensity between one and eight degrees above the horizon and the "F" light must reach 200-candela average intensity between one and ten degrees above the horizon.

FIELD OF THE INVENTION

This invention is in the field of optical systems for omni-directional lights principally used for airport taxiway-runway intersections or heliports.

BACKGROUND OF THE INVENTION

Known models of in-pavement, omni-directional taxiway lights rely principally on designs that protrude somewhat above the pavement. For example, ADB-Alnaco, Inc. of Columbus, Ohio (a subsidiary of Siemens) and Crouse-Hinds of Windsor, Conn. (a unit of Cooper Industries) market popular lamps consisting of a housing supporting a series of vertically oriented windows arranged in a "lighthouse" configuration. However, such protruding designs suffer from significant disadvantages. Even with tapered risers of the sort used by those companies' products, such housings have a tendency to rip out of the ground when contacted by scraping equipment such as snowplows. That results in expensive damage to equipment and can delay reopening of an airport after weather interruptions.

Known flush-mounted airport lights are expensive, difficult to manufacture, unable to support high loads (such as from a wheel of a jumbo jet), or do not meet the FAA specifications for low-angle light intensity. The inventive apparatus, by contrast, suffers from none of those problems, yet is implemented in a design that protrudes less that one half of a centimeter above the ground, as opposed to two or three centimeters, common to the other lights on the market.

It is therefore a principal object of the invention to provide a flush-mounted, in-pavement, omni-directional taxiway light.

It is another object of the invention to provide a-taxiway light that provides high light intensity at low angles while remaining substantially flush with the taxiway surface.

It is another object of the invention to provide a flush light that is easy to produce.

It is another object of the invention to provide a flush light and associated housing that can support high loads.

It is another object of the invention to provide a substantially convex-top flush light that allows rain to flow off to the sides of the light without pooling in depressions in the light.

It is another object of the invention to provide an optical system for a taxiway light that can redirect a substantial portion of the light to nearly right angles.

It is another object of the invention to provide a taxiway light system with a conjugate pair of lenses, the top one of which has a concave central inclusion at its bottom and a convex top surface, and the bottom one of which is configured to act as a condenser.

It is another object of the invention to provide a lens system that redirects a portion of a vertical light beam to bend that portion more that 90°, and then to reflect such portions to reinforce the light intensity at angles slightly less than 90° bent from vertical.

It is another object of the invention to provide a flush light system with a top, beam-spreading lens, and a bottom lens that focuses the beam to a focal point at or below the bottom surface of the top lens, thereby allowing light to spread across substantially the entire surface of the top lens.

SUMMARY OF THE INVENTION

The above and other objects of the invention are achieved in a preferred embodiment of an omni-directional lighting system and housing in which the lenses are vertically supported along a common central axis above a lamp having a reflective backing. The lower lens has at least one convex surface and is configured to act as a condenser, focusing the light from the lamp to an axial focal point located above but near the top surface of the lower lens. The upper lens has a convex top surface and a concave bottom inclusion along the central axis. The upper lens may have a generally flat bottom surface (other than the inclusion) that is positioned to intersect the central axis at the focal point. The top surface may be spherical, parabolic, or aspherical, but is symmetric around the central axis. The inclusion may be spherical or conical. If desired, a convex reflector may be placed along the central axis to block vertical components of the light, reflecting that light back to the lamp reflector, and thus increasing the amount of light produced at low angles. The central portion of the top surface of the top lens may be flattened, thus further reducing the overall height above the taxiway pavement.

Other aspects of the invention will be appreciated by those skilled in the art after reviewing the following detailed description of the invention.

BRIEF DESCRIPTION OF THE DRAWINGS

The novel features of the invention are described with particularity in the claims. The invention, together with its objects and advantages, will be better understood after referring to the following description and the accompanying figures, in which common numerals are intended to refer to common elements.

DETAILED DESCRIPTION OF THE PREFERRED EMBODIMENTS

Figure 1:
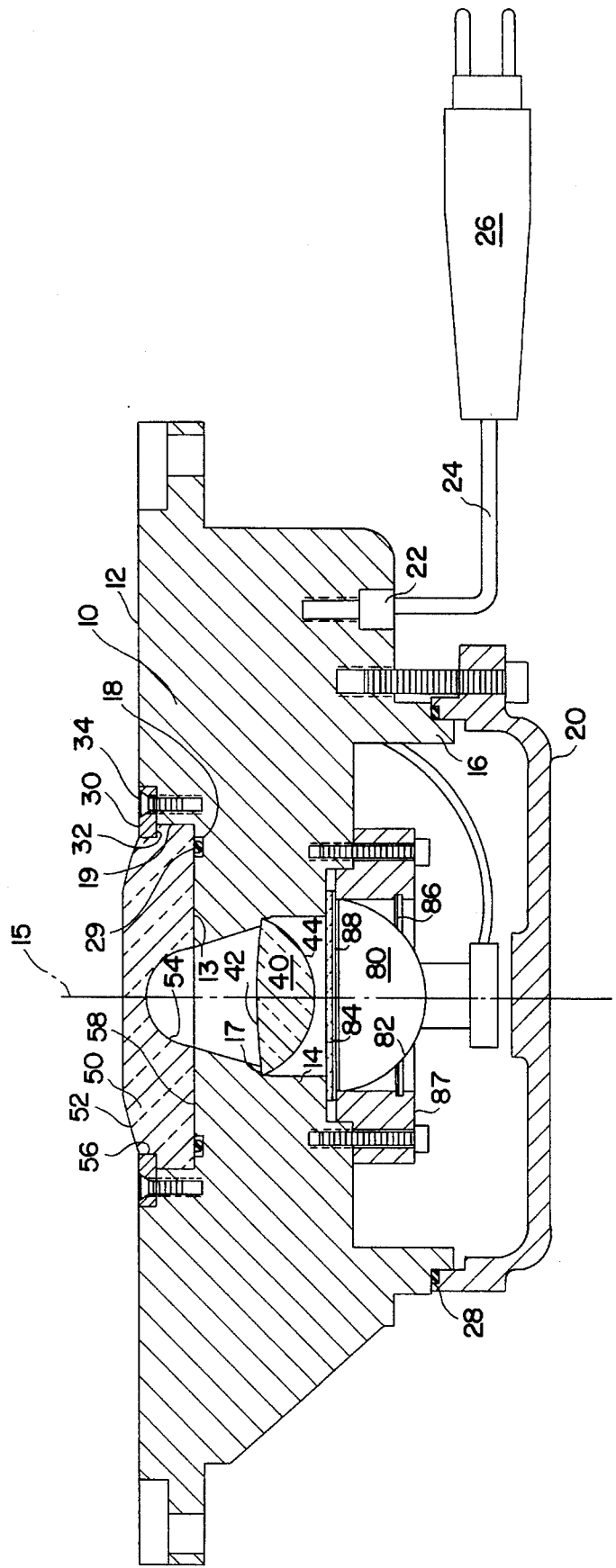
FIG. 1 is a vertical cross-sectional view of an embodiment of the inventive light assembly, including the lenses and the housing.

FIG. 1 shows a vertical cross-section of a lens and housing in accordance with the invention. Upper casing 10 is generally annular, with an elongated, substantially flat upper face 12, which, when installed, will align flush with the taxiway pavement. A flat middle face 13 of upper housing 10 is recessed, below upper face 12. Upper face 12 and middle face 13, like essentially all structural elements described below, are circular in plan view and symmetric around a central axis 15. Upper face 12 is slightly tapered, so that it is higher, by a few millimeters, at points closest to central axis 15, than at its outer perimeter.

Upper casing 10 is made of any suitably strong material, such as cast aluminum. As depicted in FIG. 1, upper casing 10 is configured to thicken substantially towards central axis 15, to maintain strength, mate with other elements, and provide for easy installation. Mating with elements described below is facilitated by a flange 16. Annular groove 18 receives a sealing ring, described below.

Lower casing 20, also made of aluminum, is coupled to flange 16 of upper casing 10, with radially spaced screws, only one of which is shown in FIG. 1. Lower casing 20 is dimensioned to fit easily in standard lighting containers, such as those specified by FAA Advisory Circular 150/5345-42C, which specifies the requirements for lighting bases.

Water-tight connector 22 permits the passage of electrical cable 24 through the wall of upper casing 10. Electrical terminus 26 can connect to an isolation transformer (not shown) of the airport power system. FAA Advisory Circular 150/5345-26B, specifies the requirements for plugs, receptacles, and cable connectors.

The FAA specifications and other documents identified in section 2 of the FAA Circular -46A are pertinent to other aspects of the basic design and are hereby incorporated by reference. The inventive assembly shown here is designed to comply with all applicable FAA specifications, including specifically those in Circular -46A.

Aluminum retaining ring 30 fits snugly inside the inner perimeter of upper casing 10, defined by inner face 19. Ring 30 extends closer to central axis 15 than inner face 19, so as to form an overhang 32 at the inner perimeter of ring 30. Retaining screws 34 have flat heads countersunk at a plurality of radial positions and function to hold together retaining ring 30 and upper casing 10.

Upper lens 50 is sized to fit on top of middle face 13 of upper housing 10 and is secured in place by retaining ring 30. Upper lens 50 is made of clear, low-expansion borosilicate glass.

Upper lens 50 has a convex top surface 52, which, in the embodiment shown in FIG. 1, is generally spherical.

Inner surface 54 of upper lens 50 is concave, but also spherical in shape, with a radius of curvature much less than that of top, concave surface 52. The radius of curvature of surface 54 may be optimized to insure adequate strength of the glass between surfaces 54 and 52, while minimizing the quantity of material required. Shoulder 56 of upper lens 50 matches overhang 32 of retaining ring 30. Upper lens 50 also has an annular flat bottom 58, at locations other than below inclusion 54, which rests on and is pressed against middle face 13 of upper housing 10. The center of curvature of spherical surface 54 is, in the embodiment shown, within the plane of bottom 58, making surface 54 exactly hemispheric.

Although top surface 52 of lens 50 domes higher than retaining ring 30, the elements described above are dimensioned to provide a smooth, continuous surface extending across the inventive lamp, including upper face 12 of upper casing 10, the top face of retaining ring 30, the flat heads of screws 34, and top surface 52 of upper lens 50. The highest point of top surface 52, where that surface intersects central axis 15, is, in the embodiment shown, only about four millimeters (about a sixth of an inch) above the upper face of retaining ring 30. Rain, melted snow, or other liquids that fall onto the fixture will run off to the sides, because the central portions of the apparatus are higher than the outer perimeter. However, the generally smooth top surface of the inventive apparatus allows for snow removal equipment or vehicles to pass over the apparatus, without causing damage to the lens or the housing.

The preferred embodiment is sealed to prevent fluid from flowing into the interior of the apparatus. Elastomeric O-rings 28 and 29, such as made of silicone, seal the joints between upper casing 10, lower casing 20, and upper lens 50. Those elements together make up a completely sealed housing for the fixture. O-ring 29 is seated in groove 18 of upper casing 10.

Inner face 14 of upper housing 10 supports a lower lens 40. Shoulder 17, located near the middle of inner face 14, acts as a stop when inserting lens 40. Lower lens 40 is affixed to shoulder 17 by epoxy adhesive.

Lamp assembly 80 preferably contains a high-powered, constant-current, tungsten-halogen lamp with an integral elliptical reflector 82 and a clear cover 84 that supports a dichroic filter 88. A 45-watt lamp and a 150-watt lamp, are suitable for the "E" and "F" lights, respectively. Retaining clip 86 holds lamp assembly 80 and filter 88 in place, together with screw-secured cover-ring 87.

Lower lens 40 consists of opposing convex surfaces 42 and 44. Upper surface 42 is nearly flat, but actually is a spherical surface with an extremely high radius of curvature. Lower surface 44 is also spherical.

Figure 2:
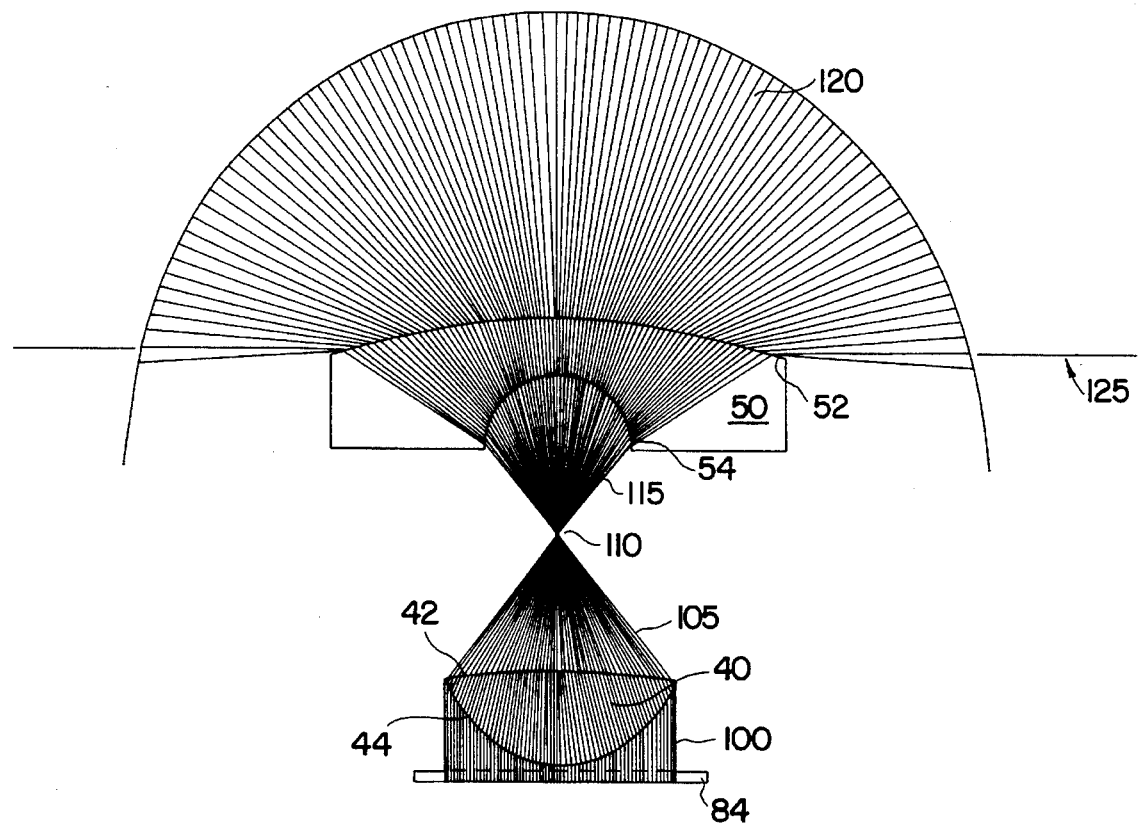
FIG. 2 is an ray-trace diagram showing-the light output of the embodiment of FIG. 1.

The optical function of the arrangement of FIG. 1 is shown in the simplified ray-trace diagram of FIG. 2. Initially, lamp assembly 80 emits a beam of light that is largely comprised of nearly parallel, vertical rays, roughly evenly distributed across the circular surface defined by cover 84.

Dichroic filter 88 ensures that the beam consists of the proper color light, such as yellow. Although colored glass filters can be used, dichroic filter are preferred because they are more efficient.

The resulting beam is shown as 100 in FIG. 2. Lower surface 44 of lower lens 40 redirects beam 100 of parallel rays into a conical shape, and upper surface 42 further condenses the beam (to 105 in FIG. 2). Thus, lens 40 acts as a condenser, focusing the light beam through a focal point 110 in FIG. 2, which is also indicated with a cross along central axis 15 in FIG. 1.

After passing through focal point 110, the light beam becomes an expanding cone 115. Focal point 110 falls close to the center of curvature of inner surface 54 of lens 50 because (a) focal point 110 is within or near the plane formed by the bottom 58 of upper lens 50, (b) spherical inner surface 54 of lens 50 has a center of curvature that is also near the plane formed by bottom 58, and (c) the two points are coaxial along central axis 15. As a consequence, conical light pattern 115 is altered only slightly by surface 54, as illustrated in FIG. 2. If desired, focal point 110 can be moved up or down from plane 58, to adjust the spread of light to match the width of outer surface 52 of lens 50, in view of such factors as the width of beam 100 and the power and vertical location of condenser lens 40. The radius of curvature of surface 54 should be sufficiently great as to allow essentially all of cone 115 to pass into lens 50 through inner surface 54, not through flat bottom surface 58.

Finally, convex outer surface 52 further spreads conical beam 115, creating the final pattern 120 in FIG. 2. Although pattern 120 appears roughly uniform in FIG. 2, in practice, the light intensity parallel to axis 15 is slightly greater than that perpendicular to axis 15. (The pattern 120 is rotationally symmetric around axis 15.) To partially compensate for that result, the lenses are arranged so as to bend the outermost rays of beam 100 slightly more than 90° in the final pattern 120. Those rays (shown as the lowest, downwardly trending rays in pattern 120) will strike retaining ring 30 and upper face 12 of upper casing 10 (FIG. 1), at a shallow angle. In a preferred embodiment, face 12 and the upper surface of ring 30 are polished so as to reflective. Consequently, most of the downwardly trending light rays in FIG. 2 will become slightly upwardly trending. Although the effect of that reflection is not shown in FIG. 2, the effect can be determined by vertically flipping the pattern of downwardly trending rays around horizon line 125. In that manner, the intensity of light just above (at small positive angles to) horizon 125 can be further enhanced. The effect can be achieved by extending top surface 52 of lens 50 sufficiently far from central axis 15, in an amount that depends on the index of refraction of the material of lens 50, and by adjusting the power of condensing lens 40 or the vertical position of focal point 110 so as to ensure that the light passes through the extended part of top surface 52.

The shape of top surface 52 is the most critical to the final output pattern. Top surface 52 should be configured to minimize the above-ground height while preventing total internal reflection of the light. Acceptable results have been achieved with spherical surfaces, but parabolic or asymmetric surfaces can also achieve good results.

Figure 3:
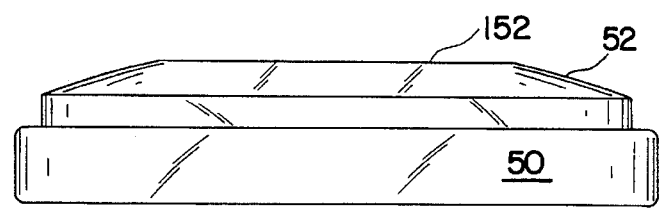
FIG. 3 is a side view of a preferred embodiment of a top lens usable in the embodiment of FIG. 1.

An improved version of the invention calls for a flat surface on the central portion of top surface 52 and a rounded surface elsewhere. FIG. 1 illustrates that embodiment, which is shown in greater detail in the side view of FIG. 3. The flat central area 152 allows for reduced total height while detracting little from the light intensity at the critical angles below 10° above the horizon. The reflective system described above can further limit the importance of a curved central area.

Another alternative embodiment of surface 52 uses Fresnel gratings (not shown). Such a system can further reduce the overall height, but at the cost of increased manufacturing difficulty.

The inner surface 54 can alternatively be shaped into a conical section with the apex along central axis 15 and the base parallel to bottom surface 58. Such an arrangement directs more of the light to the edges of top surface 52.

Condenser lens 40 can be varied considerably as well, but the disclosed embodiment permits the use of inexpensive, stock parts. Lens 40 should have a short focal length, however, to allow for a flat overall structure and sharp incidence angles to the top lens.

An elliptical reflector is used at surface 82 because of the characteristics of the tungsten filament of lamp 80. That provides a slightly expanded focal point 110. However, a parabolic reflector may also be suitable.

The inventive fixture can accept high roll-over loads, such as imposed by the wheel of a wide-body passenger jet. Downward loading is quickly transferred to upper and lower casings 10 and 20. If an impact or excessive load damages the fixture, however, it is likely that only one lens, top lens 50, would need replacement.

To further concentrate the light in a near-horizontal plane, the inventive assembly can be easily modified, or even retrofitted, to block the light output along axis 15. That can be easily achieved by adding a downward-facing reflector (not shown) at any of several locations, such as on surface 52, on surface 54, on the center of an otherwise transparent insert between lenses 40 and 50, on surface 42, on surface 44, or on cover 84. Preferably, the reflector should be configured to scatter the light to some extent, so that the return light is bounced off of reflector 82 at an angle, thereby including the light, on the next reflection, in the beam that bypasses the reflector, thus causing its emission closer to horizon 125. That result can be achieved by using a slightly arched reflector (placed on either a flat or a curved surface), which is thicker at axis 15 than at off-axis locations.

Although the invention has been described with reference to specific embodiments, many modifications and variations of such embodiments can be made without departing from the innovative concepts disclosed.

Thus, it is understood by those skilled in the art that alternative forms and embodiments of the invention can be devised without departing from its spirit and scope. The foregoing and all other such modifications and variations are intended to be included within the spirit and scope of the appended claims.

I claim:

1. An omni-directional taxiway light comprising:
   (a) an annular housing having a substantially flat, upper surface surrounding an axis passing through the center of the annular housing and perpendicular to the upper surface of the housing;
   (b) a first lens supported by and covering the interior of the annular housing;
   (c) said first lens having a convex top surface generally parallel to the upper surface of the housing but protruding slightly thereabove, and having a generally flat bottom surface with a concave inclusion surrounding the central axis;
   (d) a lamp positioned in the housing below the first lens so that light from the lamp is initially directed generally parallel to the central axis towards the first lens;
   (e) a second lens located in the housing between the lamp and the first lens and positioned and configured to focus light from the lamp to a focal point along the central axis; and
   (f) wherein the first and second lens are configured to direct light above the housing in all angles between zero and ninety degrees relative to the central axis and in all directions from the central axis.

2. The apparatus of claim I wherein the focal point is in a plane containing the bottom surface of the first lens.

3. The apparatus of claim 2 wherein the concave inclusion is spherical.

4. The apparatus of claim 1 wherein the first lens is also configured to direct some light at an angle greater than ninety degrees from the central axis.

5. The apparatus of claim 4 wherein the top surface of the housing is reflective and wherein the majority of light directed at an angle greater than 90° from the central axis is reflected by the top surface of the housing to a final angle less than 90° from the central axis.

6. The apparatus of claim 1 wherein at least half of the total luminance of the apparatus is directed at those angles between 80 and 90 degrees from the central axis.

7. The apparatus of claim 1 wherein the top surface of the first lens comprises a spherical section.

8. The apparatus of claim 1 wherein the top surface of the first lens is parabolic.

9. The apparatus of claim 1, wherein the top surface of the first lens extends less than one centimeter above the upper surface of the housing.

10. The apparatus of claim 1 wherein the top surface of the first lens comprises a substantially flat central portion located closer to the top surface of the housing than a hypothetical curve defined by extending the convex surface at location of the top lens outside the central portion.

11. The apparatus of claim 10 wherein the top surface is spherical other than at the central portion.

12. The apparatus of claim 10 wherein the flat portion of the first lens extends less than one-half centimeter above the upper surface of the housing, and wherein at least half of the total luminance of the apparatus is directed at those angles between 80 and 90 degrees from the central axis.

13. The apparatus of claim 12 wherein the first lens is also configured to direct some light at an angle greater than ninety degrees from the central axis, and wherein the majority of light directed at an angle greater than 90° from the central axis is reflected by the top surface of the housing to a final angle less than 90° from the central axis.

14. The apparatus of claim 1 further comprising an axial reflector positioned to reflect a portion of the light from the lamp back towards the lamp, wherein the reflector is thicker along the central axis than away from the central axis, wherein the lamp has a reflector behind the lamp positioned to direct lamp light in a beam generally parallel to the central axis, and wherein the axial reflector extends only part-way from the central axis to the edge of the beam.

15. An omni-directional taxiway light comprising:
  (a) means for holding, in a water-tight fashion, electrical components including a lamp;
  (b) means for focusing light from the lamp to a focal point; and
  (c) means for spreading light passing through the focal point into a hemispherical pattern.

16. The apparatus of claim 15 wherein the spreading means also functions to bend at least half of the light emanating from the lamp between 80 to 90 degrees from an axial ray extending from the center of the lamp and passing through the focal point, and wherein said bent light is directed within said range of angles in all radial directions from said axis.

17. The apparatus of claim 15 wherein the spreading means also functions to bend some of the light emanating from the lamp more than 90 degrees from an axial ray extending from the center of the lamp and passing through the focal point.

18. A method of lighting a taxiway comprising:
  (a) generating a vertical beam of light from a lamp;
  (b) focusing the light beam to a focal point; and
  (c) after the light has passed through the focal point, spreading the light into a hemispherical pattern above the taxiway centered on a point directly above the vertical beam and less than half a centimeter above the taxiway.

19. The method of claim 15 wherein part (c) comprises bending at least half of the total light emanating from the lamp so said bent light is directed at angles between zero and ten degrees elevation above the taxiway, in all directions.

20. The method of claim 15 wherein part (c) also comprises bending a portion of the light emanating from the lamp at more than a right angle from the initially vertical beam, so that the portion of light is directed slightly downward, and further comprising, thereafter reflecting the portion of light from a substantially horizontal surface so that the portion of light is directed at angles between zero and ten degrees elevation above the taxiway.

\* \* \* \* \*